Figure 1:
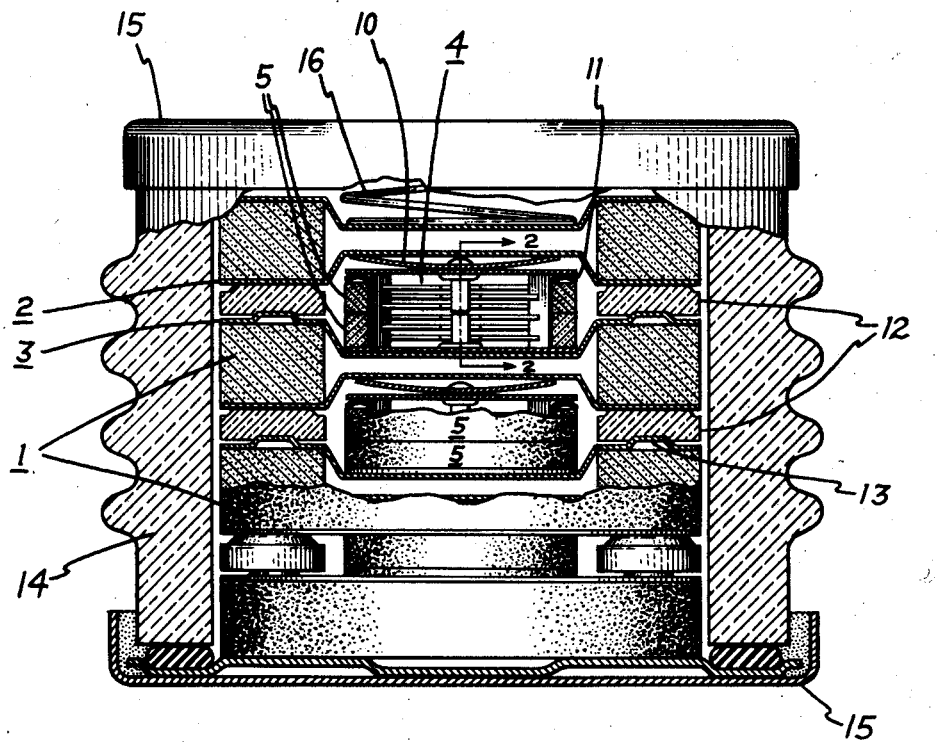

June 9, 1959          A. A. OLSEN          2,890,383

STACKING ARRANGEMENT FOR LIGHTNING ARRESTER COMPONENTS

Filed Nov. 15, 1957          2 Sheets-Sheet 1

Inventor,
Arthur A. Olsen,
by Gilbert P. Tarleton
His Attorney.

June 9, 1959  A. A. OLSEN  2,890,383
STACKING ARRANGEMENT FOR LIGHTNING ARRESTER COMPONENTS
Filed Nov. 15, 1957  2 Sheets-Sheet 2

Inventor,
Arthur A. Olsen,
by Gilbert P. Tarleton
His Attorney.

United States Patent Office 2,890,383
Patented June 9, 1959

2,890,383

STACKING ARRANGEMENT FOR LIGHTNING ARRESTER COMPONENTS

Arthur A. Olsen, Pittsfield, Mass., assignor to General Electric Company, a corporation of New York Application November 15, 1957, Serial No. 696,766

3 Claims. (Cl. 315—36)

This invention relates to lightning arresters, and more particularly, to an improved stacking arrangement for the parts of a valve type lightning arrester.

The invention is useful with valve type lightning arresters generally. However, it is illustrated with respect to a magne-valve lightning arreaster which provides magnetic as well as valve action.

By a magne-valve lightning arrester is meant an arrester which has magnetic means for moving and elongating the power follow current arc and valve means for reducing the power follow current whereby the power arc following dissipation of the lightning surge to ground is extinguished. Conventionally, the valve element comprises a block of non-linear resistance material. The arc is established, moved and elongated in an arc gap unit. The gap unit may have magnetic means built into it for moving and elongating the arc, or a separate magnetic unit can be provided for this purpose.

One or more of these valve, gap and magnetic units are connected in series to form a magne-valve lightning arrester. These units conventionally are built up into a vertical stack inside a porcelain lightning arrester housing or the like.

The number of these units which are placed in the housing will depend upon the overvoltage level to be protected against. However, there is a limit to how high an individual housing can be made so for high overvoltage protective levels several housings are stacked one on the other and bolted end to end.

For high overvoltage protective levels, the conventional stacked lightning arresters become very high and require special bracing. Also, the voltage distribution along the stacks and the individual lightning arresters becomes more unequal as their height is increased. In order to correct for this unequal voltage distribution, it is conventional to use voltage grading units such as capacitors and resistors.

It is an object of this invention to provide a stacking arrangement for the parts of a valve type lightning arrester which will overcome the above discussed disadvantages.

It is a further object of this invention to provide an improved magne-valve stacked lightning arrester.

In my invention the valve units are annular shaped and the gap units are positioned inside a stack of valve units and are supported from the stack of valve units. This reduces the height of existing lightning arrester installations and does away with the need for expensive bracings. The stacking arrangement is such that the valve units carry the weight of the whole assembly and the weight is kept off the gap units which conventionally are not designed or intended to carry much weight. Preferably, the means for supporting the gap units comprise pairs of contact plates for supporting the gap units from the stack of valve units in alternating fashion and for connecting the gap and valve units in series. Space is provided between the plates for inserting voltage grading capacitors and resistors in shunt with the gap units in the event that it is necessary to correct the voltage distribution along the stack.

The features of my invention which I believe to be novel are set forth with particularity in the appended claims. My invention itself, however, both as to its organization and method of operation, together with further objects and advantages thereof, may best be understood by reference to the following description taken in connection with the accompanying drawings.

Figure 2:
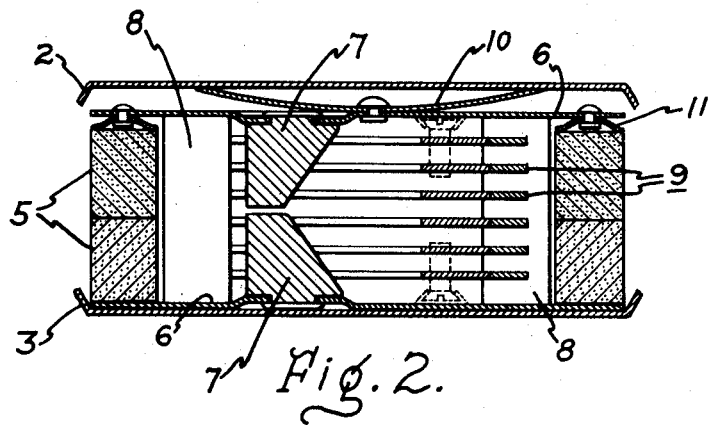
Figure 3:
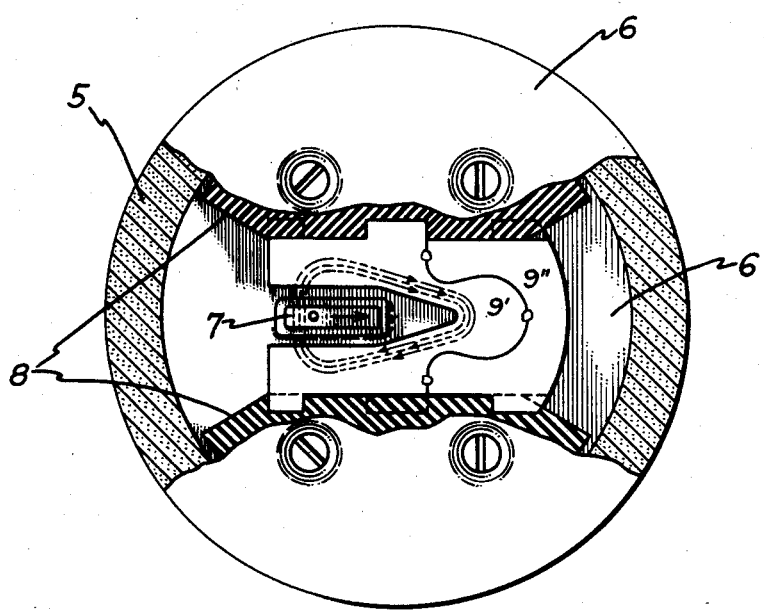

In the drawings, Fig. 1 is a broken away elevation view of one form of my invention. Fig. 2 is a section taken along the line 2—2 of Fig. 1 but to increased scale to better show the details of one of the magnetic gap units. Fig. 3 is a broken away top view of the gap unit of Fig. 2. Like reference numerals will be used throughout the various figures to indicate similar parts.

Referring now particularly to Fig. 1 of the drawings, illustrated therein is a magne-valve lightning arrester assembly which comprises a plurality of stacked valve elements 1. The valve elements 1 are annular in shape and are superposed with respect to each other in spaced relationship. Extending between adjacent pairs of valve elements is a pair of spaced plates 2 and 3 which may be circular. The plates 2 and 3 are pressed or bulged away from each other at their central portions for receiving a gap unit 4 and magnetic means for moving the arc in the gap unit 4 as well as voltage grading resistors 5. The particular gap unit which is illustrated is claimed and disclosed in detail in construction and operation in copending Snell patent application, Serial Number 547,780, filed November 18, 1955 and assigned to the same assignee as the instant invention. It has magnetic means built into it for moving, elongating and dividing the electrical arc. However, it will be appreciated that the plates 2 and 3 can be adapted to support separate gap and magnetic means units such as illustrated in Olsen et al. Patent 2,644,116 issued June 3, 1953 and assigned to the same assignee as the instant invention. The gap unit 4 is designed to move and elongate the initial power follow current arc and divide it into a plurality of arcs. However, a gap unit having magnetic means for moving the arc and elongating it without dividing it can be used in accordance with the teachings of copending Snell patent application, Serial Number 547,779, filed November 18, 1955, now abandoned, and assigned to the same assignee as the instant invention.

Referring now also to Figs. 2 and 3, the gap unit 4 broadly comprises a pair of contact plates 6 which support a pair of spaced electrodes 7. Disposed between the plates 6 and supported by a pair of electrical insulating material blocks 8 are a plurality of arc dividing plates 9 which are provided with magnetic means for moving the arc which is established across the electrodes 7 into the plates 9. As best seen from Fig. 3, the plates 9 have magnetic portions 9' which are inserted into non-magnetic portions 9''. Parts 9' and 9'' can be connected together by welds or the like. When an electrical arc is established across the electrodes 7, the magnetic portions 9' move the arc into the plates 9 to subdivide it. The non-magnetic portions 9'' prevent the subdivided arc from being driven to the right-hand edges of the plates 9 where they could recombine into a single arc.

The upper plates 6 have a resilient connector such as a spring plate 10 or the like fastened thereto so that the weight of the valve elements 1 is not carried by the gap units. The grading resistors 5 are annular in shape and surround the gap units. The grading resistors 5 are in shunt relationship with the gap units inasmuch as their lower surface makes contact with the lower plates 6 and their upper surface makes electrical contact with the upper plates 6 by virtue of a spring 11 or the like.

Voltage grading capacitor units 12 can be placed in shunt with the gap units by inserting them between the circumferential portions of the plates 2 and 3. The capacitors 2 can be held in place by bumps or the like 13 formed in the plates 3 which register the concave undersurfaces of the capacitors 12. The capacitors 12 can be circular and three or so of them can be used between plates 2 and 3 to make the stack stable. However, it will be appreciated that other configurations can be given to the capacitors and other numbers of them can be used for the purpose of making the stack stable.

When the capacitors 12 are in place the valve units 1 and capacitors 12 bear down on each other and support the weight of each other before the springs 10 are fully compressed. In this manner, the stack of valve elements supports the weight of the entire assembly and the weight is kept off the gap units 4. In the event no capacitor units 12 are used in shunt with the gap units then insulating spacers are substituted for the capacitors 12 so as to keep the weight of the blocks 1 off the gap units 4. The plates 2 may be provided with a limited amount of resiliency so that their circumferential portions will engage the upper surfaces of the capacitors 12 before the springs 10 are fully compressed. However, this is not necessary if the springs 10 are properly selected.

The bulged central parts of plates 2 and 3 which are positioned between adjacent gap units are separated from each other by spaces. Other capacitors can be put in these spaces for parallel connection with the valve elements 1. Such capacitors would be for the purpose of reducing the impulse sparkover at steep rates of voltage rise by limiting the voltage across the valve elements 1 caused by the current of capacitors 12 and would not materially affect the 60 cycle voltage distribution due to the low impedance of the parallel valve elements 1.

The stacked assembly is conventionally placed inside a porcelain or other electrical insulating material housing 14 and then the ends of the housing are closed by end caps 15 or the like which are sealed in a well known manner. Electrical contact is obtained between the upper cap 15 and the upper end of the stack by means such as a spring 16.

In my invention the installation is about one-half the height of the present commercial installations of equivalent rating. Also, the installation is more stable than present commercial installations inasmuch as besides being lower in height it is also greater in width. That is, if present commercial practice were followed the valve elements 1 would not be annular and surround the gap units 4 but would be solid and about twice as high and would have a width roughly equal to the gap units 4. Such solid valve blocks would be alternated with the gap units 4 in a vertical stack. Obviously, such an arrangement would be less stable than that provided by my invention inasmuch as it would be about twice as high and about one-half as wide. Therefore, my invention makes it possible to eliminate the expensive bracings which are used with existing commercial lightning arrester installations. Also, it considerably reduces the amount of space required by prior art lightning arresters and installations of equivalent rating.

In the operation of my invention one end cap 15 is connected to the line side of an electrical apparatus which is to be protected and the other end cap is connected to ground. A lightning surge will be by-passed around the protected apparatus to ground through the lightning arrester. The valve elements 1 will present a low resistance to the lightning surge and the gaps across the electrodes 7 will be broken down and the surge will be dissipated to ground. After the surge is dissipated to ground the power follow current tends to maintain the arc which is established at the electrodes 7. However, the valve elements 1 then present a high resistance to normal power current and therefore reduce the power follow current. Also, the magnetic portions 9' move the electrical arc into the plates 9 whereby the arcs are elongated, subdivided and cooled. This combination of choking off of the arc current and elongation, subdivision and cooling of the arcs results in extinguishment of the arcs.

Normally, the voltage between line and ground would not divide equally along the several gap units. The voltage grading elements 5 and 12 make it possible to distribute the line to ground voltage along the gap units so that each gap unit carries its intended share of the line to ground voltage.

While there has been shown and described a particular embodiment of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. A lightning arrester comprising a plurality of gap, valve and capacitor units, said valve units being annular shaped and being superposed with respect to each other and being alternated with said capacitor units to form a stack of alternated capacitor and valve units, means for supporting said gap units from said stack and for alternately connecting said valve and gap units electrically in series and said capacitor and gap units electrically in parallel, said means comprising pairs of spaced plates which at their circumferential portions extend between said alternated valve and capacitor units and at their central portions receive said gap units therebetween.

2. A magne-valve lightning arrester comprising a plurality of magnetic action gap units, a plurality of valve units, and a plurality of voltage grading capacitor and resistance units, said valve units being annular shaped and said capacitor units being alternated with said valve units to form a stack of alternated valve and capacitor units, said resistance units being annular shaped and surrounding and being connected electrically in shunt with said gap units, and means for supporting said gap units and their respective resistance units from said stack of alternated valve and capacitor units and for alternately connecting said valve units electrically in series with said gap units and said capacitor units electrically in shunt with said gap units, said means comprising spaced pairs of spaced contact plates which at their circumferential portions extend between said alternated valve and capacitor units and which at their central portions receive said gap units and their respective resistance units therebetween.

3. A lightning arrester comprising a plurality of gap and valve units, said valve unit being annular shaped and being superposed with respect to each other in spaced relationship, said gap units being superposed with respect to each other in spaced relationship, said gap units being positioned inside said superposed valve units means for suspending said gap units from said valve units, capacitor units positioned between said spaced valve units and said means connecting said capacitor units electrically in shunt with said gap units and said valve and gap units electrically in series, said means comprising pairs of spaced plates which are bulged adjacent their central portions away from each other for receiving said gap units therebetween and at their circumferential portions extend between said valve and capacitor units.

References Cited in the file of this patent

UNITED STATES PATENTS

| | | |
|---|---|---|
| 2,324,108 | Pyk | July 13, 1943 |
| 2,618,765 | Vogelsanger | Nov. 18, 1952 |
| 2,807,751 | Nilsson | Sept. 24, 1957 |